(12) United States Patent
Kendall

(10) Patent No.: US 6,601,321 B1
(45) Date of Patent: Aug. 5, 2003

(54) DEVICES FOR SUSPENDING A FOOT WITHIN A SHOE, AND SHOES INCORPORATING SUCH DEVICES

(75) Inventor: Michael Kendall, 11652 Tierra Del Sur, San Diego, CA (US) 92130

(73) Assignee: Michael Kendall, San Diego, CA (US)

( * ) Notice: Subject to any disclaimer, the term of this patent is extended or adjusted under 35 U.S.C. 154(b) by 0 days.

(21) Appl. No.: 09/667,192

(22) Filed: Sep. 20, 2000

Related U.S. Application Data (60) Provisional application No. 60/202,009, filed on May 4, 2000.

(51) Int. Cl.[7] .................................................. A43B 7/14
(52) U.S. Cl. ................................ 36/88; 36/25 R; 36/93
(58) Field of Search .............................. 36/27, 28, 88, 36/93, 25 R, 91, 69, 55

(56) References Cited

U.S. PATENT DOCUMENTS

| | | | |
|---|---|---|---|
| 3,834,046 A | | 9/1974 | Fowler |
| 4,283,864 A | * | 8/1981 | Lipfert |
| 4,297,796 A | | 11/1981 | Stirtz et al. |
| 4,681,114 A | * | 7/1987 | Lodispoto |
| 4,706,316 A | * | 11/1987 | Tanzi |
| 4,743,323 A | | 5/1988 | Hettinga |
| 4,878,301 A | | 11/1989 | Kiyosawa |
| 4,910,887 A | | 3/1990 | Turner et al. |
| 5,070,629 A | | 12/1991 | Graham et al. |
| 5,390,430 A | * | 2/1995 | Fitchmun et al. |
| 5,561,920 A | | 10/1996 | Graham et al. |
| 5,592,757 A | * | 1/1997 | Jackinsky |
| 5,595,002 A | | 1/1997 | Slepian et al. |
| 5,680,714 A | | 10/1997 | Lopez |
| 5,729,917 A | | 3/1998 | Slepian et al. |
| 5,852,886 A | | 12/1998 | Slepian et al. |
| 5,974,695 A | | 11/1999 | Slepian et al. |
| 5,987,780 A | | 11/1999 | Lyden et al. |
| 6,035,901 A | | 3/2000 | Stumpf et al. |

FOREIGN PATENT DOCUMENTS

| | | |
|---|---|---|
| FR | 1068538 | 2/1954 |
| FR | 1098621 | 3/1955 |
| GB | 2 243 530 A | 11/1991 |

* cited by examiner

Primary Examiner—M. D. Patterson
(74) Attorney, Agent, or Firm—Stacy L. Taylor; Foley & Lardner (57) ABSTRACT

An improved sole construction for use in shoes. The sole construction consists of a hammock-like lattice formed of medium to high modulus polymers, or a lightweight metal alloy. The lattice substantially conforms in topography to the foot, or a weight-bearing portion thereof (such as the heel or forefoot). The lattice may be disposed on, and supported by, a resilient frame, or secured directly to the shoe upper. The lattice supports the foot while suspending it slightly, even during gait, above the interior base of the shoe. The suspended portions of the foot are thusly protected from the shock of striking a surface (such as the ground, during gait), and are gently supported while bearing a load.

51 Claims, 5 Drawing Sheets

DEVICES FOR SUSPENDING A FOOT WITHIN A SHOE, AND SHOES INCORPORATING SUCH DEVICES

RELATED PATENT APPLICATIONS

This application is a continuation in part of, and claims priority from, U.S. Patent Application Serial No. 60/202,009, filed on May 4, 2000.

FIELD OF THE INVENTION

The invention relates to footwear, namely the interior sole structures of shoes. In particular, the invention relates to constructions for use as an interior sole of a shoe, to wholly or partially suspend a foot above the base of the shoe, even during gait.

HISTORY OF THE RELATED ART

In recent years, the increasing popularity of shoes designed for enhanced comfort has led to a number of improvements to the insole structure of different types of shoes. Innovations in flexible cushioning materials, such as the development of molded ethylene vinyl acetate (EVA) outsoles and polyurethane foam insoles, have enabled manufacturers to provide a degree of shock attenuation in dress shoes typically reserved to athletic shoe designs. Integration of orthotic structures, such as heel cups, into shoes can also provide the wearer with better support and greater stability during gait.

Many such improvements have had their genesis in athletic shoe design. For example, the desire to enhance the performance capabilities of running shoes led to the development of midsoles with fluid or gas filled bladders embedded at strategic points for use in absorbing energy transmitted to the shoe during gait, and releasing it afterward (a recent iteration of the bladder technology is found in U.S. Pat. No. 5,987,780). A similar goal is targeted in shoes which include a trampoline-like structure incorporated into the heel and/or other regions of an otherwise cushioned midsole (see, e.g., U.S. Pat. Nos. 5,070,627 and 5,561,920). In the trampoline design, a grid formed of resilient fibers is stretched tautly beneath strike points of the foot, such as the heel. In both the trampoline and bladder designs, the energy return system acts like a spring, compressing on application of a force, then returning to its original shape on removal of the force.

While each of the aforementioned designs has its advantages, all also have limitations. For example, soft molded insoles and outsoles can become uncomfortable if their contours do not match those of the wearer's foot. In the trampoline and bladder designs, the springiness which improves performance if used at discreet points in an otherwise conventional midsole design can cause the shoe to become unstable if added throughout the midsole. Foot fatigue is also an issue for all of these designs, which still rely on the foot to absorb and deflect a significant amount of the force generated during gait.

Further, customizability is largely lacking among existing shoe designs, most of which allow for little, if any, modification of the midsole by the wearer. As an alternative, one could use a custom designed orthotic device for insertion into a conventional shoe which addresses the wearer's specific orthotic needs. However, such devices have limited adaptability to different shoe structures (e.g., most are not suitable for use in shoes with raised heels), and are usually expensive to purchase.

SUMMARY OF THE INVENTION

The invention provides shoes with an improved sole structure, as well as removable orthotic soles, which each overcome many of the limiatations of the prior art by suspending the foot above the base of a shoe. The invention also allows for relatively low cost manufacture of a lightweight shoe, by providing means by which the inventive sole and shoe upper may be manufactured as a unitary structure.

In all of the embodiments of the invention, the invention includes a hammock-like lattice which substantially conforms in topography to the foot, or a weight-bearing portion thereof (such as the heel or forefoot). Although the lattice may optionally contact or be incorporated with components which provide for energy return and cushioning, the principal role of the lattice is to support and control the position of the foot. This function is provided by suspending the foot slightly above the base of the shoe at all times, even during gait. In this manner, the suspended portions of the foot are largely protected from the shock which is transmitted upwardly from the ground during gait, and are gently supported while bearing a load, an especially useful feature when standing for a long period of time.

In one aspect, the invention consists of a shoe in which the lattice comprises the all or a part of the interior sole structure of the shoe (including the midsole and insole layers). The shoe further consists of an upper to encircle all or part of the wearer's foot, and an outsole adapted to engage the ground.

In one such embodiment, the lattice is disposed within the shoe on a scaffolding consisting of an annular frame supported vertically by side pillars. In particular, a resilient annular frame is fitted along the inner perimeter of the shoe upper, and may optionally be secured by attachment means to the upper. The lattice is stretched between the sides of the scaffolding in the same plane as, but lying slightly above, the interior base of the shoe.

The frame is vertically supported in the shoe by a multiplicity of side pillars extending downwardly from the frame along the inner surface of the upper. Depending on the degree of vertical support required for the frame and lattice structure, the side pillars may also extend along the width of the insole liner to form "U" shaped structures, in which the bight of each "U" rests on the base of the shoe.

The lattice is preferably woven, molded or extruded to possess contours which conform substantially to the topography of the sole of a wearer's foot. The lattice is also constructed of high tensile strength, low "springiness" fibers (e.g., a polymer or lightweight metal) woven to form a mesh which deforms to the specific topography of a wearer's foot. The fibers are stretched between the sides of the frame at a relative tension sufficiently low to allow desired portions of the lattice to deform on contact, but sufficiently high to maintain the foot in suspension above the base of the shoe.

Advantageously, the lattice is preferably provided with discrete regions having different degrees of elasticity, to provide control of gait. For example, the midfoot region of the lattice underlying the arch of the foot (medial midfoot) may be less elastic than adjacent regions of the lattice, to provide for control of supination (rolling inward) during gait. Such regions of varying elasticity may be provided by increasing the relative tension of lattice fibers within a given region, or by varying the composition of the lattice, as in providing a material of low elasticity along the medial midfoot region, and more elastic material in adjacent regions.

In one aspect of the inventive shoe described, the annular frame includes rotation means at varying points (e.g., at the forefoot and heel), to allow the frame to vertically bend to, for example, allow the frame to follow the curvature of the shoe upper and outsole.

In another aspect of the inventive shoe described, the side pillars include shock absorption means, such as a piston or closed cell foam bar.

In another aspect of the inventive shoe described, energy return and/or cushioning means, such as, respectively, an air bladder or polyurethane foam pad, are incorporated into the interior base of the shoe to contact the underside of the lattice at one or more strike points along the foot, or are incorporated within the lattice itself at such points.

In another aspect of the inventive shoe described, the upper, scaffolding and, optionally, the lattice are integrally formed as a unit.

In another embodiment of the invention, a shoe is provided in which a lattice is disposed substantially as described above, except that the annular frame only extends around the inner perimeter of the upper adjacent to one or more weight-bearing regions of the foot, such that only those region(s) of the foot are suspended in the lattice.

In another embodiment of the invention, the frame and lattice are constructed substantially as described above, except that the entire sole structure may be removed from the shoe for use as an independent orthosis.

In another aspect of the both the shoe and orthosis embodiments of the invention, the annular frame includes adjustment means which allow the user to increase or decrease the tension applied to the lattice at discreet points.

In another aspect of the both the shoe and orthosis embodiments of the invention, the lattice is attached to the annular frame along a removable annular ring, to permit the lattice to be repaired, replaced or substituted with a lattice of differing structural characteristics; e.g., for a lattices having different contours.

In yet another aspect of the invention, the lattice is formed as an integral part of the shoe upper. In this embodiment, the shoe upper supports the lattice, in lieu of the annualar frame, which is therefore absent.

BRIEF DESCRIPTION OF THE DRAWINGS

FIG. 9A is a top view.

DETAILED DESCRIPTION OF THE INVENTION

I. Functionality

A. Definitions

Because the invention provides an unprecedented structure for use as the interior sole of a shoe, there is no conventional terminology which suffices to readily describe what the invention is. Certainly, the invention replaces the insole (lining contacted by the foot) and all or most of the midsole structure (cushioning and support construction) present in most shoe types. In some embodiments, the invention also replaces a substantial part of the outsole (e.g., those embodiments in which outsole material is joined directly to the inventive scaffolding). In yet other embodiments, the invention also provides the shoe upper (e.g., those embodiments in which the upper is a unitary part of the inventive scaffolding and lattice structure).

Hence, to reflect all of the attributes of the invention, the scaffolding and lattice, in combination, will be collectively referred to herein as the "sole structure" of the invention. The sole structure is referred to as suspending the foot above the "base" of a shoe, which is essentially the interior surface of a shoe outsole, to the extent present. The term "upper" will be understood to refer to the material which extends over the top of the foot, which may comprise, without limitation, a solid or banded piece of upper material (leather, canvas, microfiber, woven fabric, and the like).

B. Suspension of the Foot

In general, all embodiments of the invention described below share a common feature, which is a lattice "hammock" for the foot. When placed into the lattice, the foot remains in suspension above the shoe base, except for discrete portions of the foot which may be allowed to contact the insole during gait in certain embodiments (e.g., where the device of the invention lacks a frame extending around the toes, the portion of the toes forward of the metatarsal heads may be allowed to engage the shoe base to push off therefrom during gait).

Although under tension (which may vary at points throughout the lattice), the lattice is not tautly strung within its scaffolding, and does not primarily serve as an energy return system (e.g., a trampoline-like structure). Rather, the invention provides gentle, stable, controlled support by pulling and holding the foot, rather than pushing it into position within a shoe.

II. Scaffolding

A. Scaffolding Structure

Figure 1:
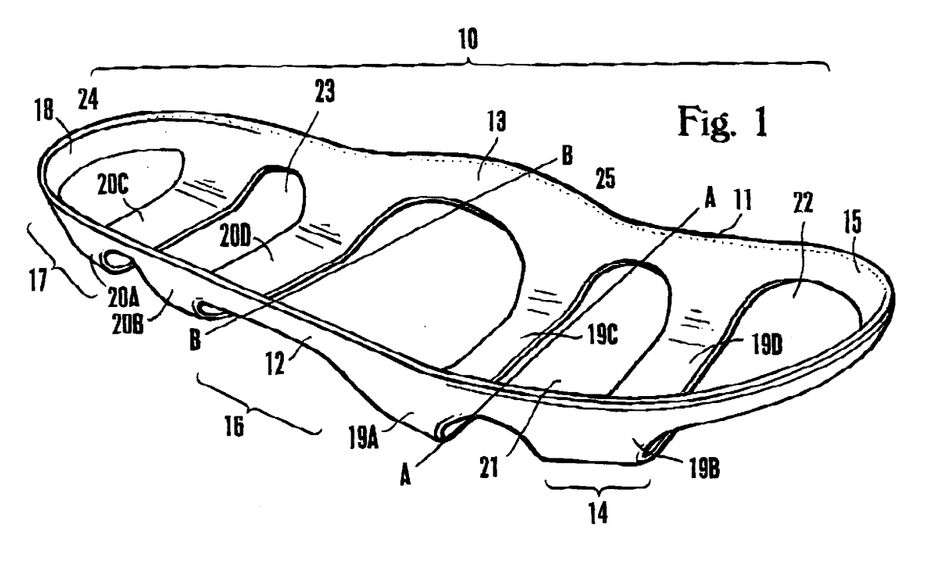
FIG. 1 is a representative scaffolding for use in a men's shoe, without a heel.
Figure 2:
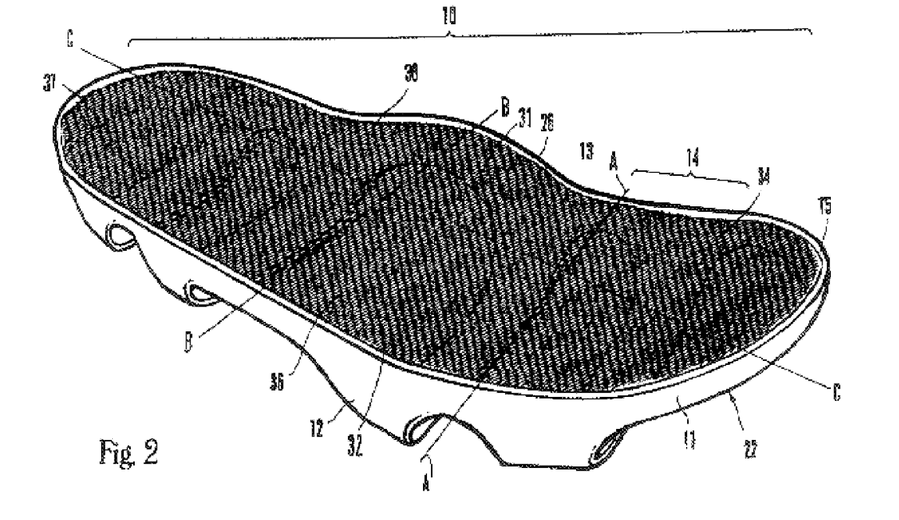
FIG. 2 is the scaffolding of FIG. 1, on which a woven lattice is disposed.

Referring to FIG. 1, a resilient polymer scaffolding 10 is shown, which is adapted to support a lattice according to the invention as the interior sole construction of a men's size 11 (US) dress shoe (a device including both scaffolding 10 and lattice 30, as later described, is shown in FIG. 2). The dimensions of the scaffolding described here conform to such a shoe; however, with an understanding of the invention provided by this disclosure, those of ordinary skill in the art will readily be able to modify the stated dimensions for use of the invention with other size and style shoes.

Figure 9A:
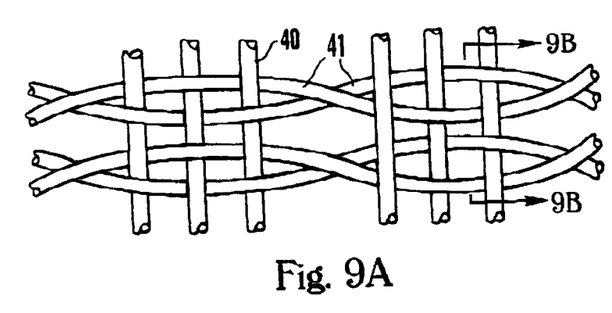

As shown in FIG. 1, scaffolding 10 consists of annular frame 11 with lateral and medial side walls (elements 12 and 13, respectively), defining a forefoot region 14 (extending rearwardly from toe end 15 to line A—A), a midfoot region 16 (lying between line A—A and line B—B), and a heel region 17 (extending rearwardly from line B—B to heel end 18). As is apparent from FIG. 1, annular frame 11 is contoured to follow the inner perimeter of a shoe upper (not shown). As shown in FIG. 9, annular frame 11 may also be integrated into the upper, so the upper, scaffolding and, if co-molded with the scaffolding, lattice, all form a unitary upper and midsole shoe construction. The latter embodiment is especially well-suited to use with an upper formed of a stretch material, such as a fabric woven with Lycra™, or a microfiber.

Vertical support of annular frame 11 is provided by several structures. First, "U" shaped members (consisting of side pillars 19A and 19B, joined respectively by bights 19C and 19D; and side pillars 20A and 20B, joined respectively by bights 20C and 20D) extend downwardly from annular frame 11 to support the frame within a shoe, in those embodiments in which annular frame 11 is not an integral part of the shoe upper. Side pillars 19A and B define a gap 21 beneath where the ball of a foot would rest in forefoot region 14; and side pillars 20A and B define a similar gap 23 in heel region 17. Additional gaps in scaffolding 10 are defined by the space separating side pillar 19B and toe end 15 (gap 22, underlying the point at which toes of a foot would rest in forefoot region 14); the space separating side pillar A and heel end 18 (gap 24, underlying the point at which a heel would rest in heel region 18); as well as by the space separating side pillars 19A and 20B (gap 25, underlying the point at which the arch of a foot would rest in midfoot region 16).

Each defined gap in the scaffolding provides space for displacement of the lattice as weight is placed thereon or the foot flexes. Gap 22 is angled upwardly (at a conventional angle of toe spring) to provide room for displacement of lattice 30 (see, FIG. 2) during the toe-off phase of gait. Gap 21 allows space for forefoot region 14 to displace downwardly as weight is transferred forward so load is carried by the toes. Gap 24 provides room for downward displacement of lattice 30 (see, FIG. 2) as weight is shifted back toward the heel, and gap 23 allows for vertical movement as needed in heel region 17. Gap 25 further allows room for frame 11 to be adapted for use in both flat heeled shoes (no flex in frame, as shown in FIG. 1) and in heeled shoes (where frame 11 would be flexed to raise heel region 17 to the degree necessary to seat it above the heel of a shoe; see, example shown in FIG. 5).

Additionally, mechanical flexure along the length of the scaffolding, in relation to motion of the foot during gait, is provided by the angle of toe spring (from 0°, wherein no flex is allowed, to about 40°, where substantial assistance in toe-off is provided). Flexure may also be provided by constructing the "U" shaped members of scaffolding 10 in a rocker configuration; i.e., one in which the bight 19D of the "U" extending from forwardmost side pillar 19B, and bight 20C extending from rearwardmost side pillar 20A, are raised slightly above the plane of midfoot side pillars 19A and 20B, as shown in FIG. 1. An alternative rocker configuration which allows for maximal rocking motion from heel to toe is one in which a single midfoot side pillar is used across the width of gap 25, in lieu of side pillars 19A and 20B. In the latter embodiment, side pillars 19B and 20A are raised above the plane of the single midfoot pillar; or one or both is absent.

Figure 3:
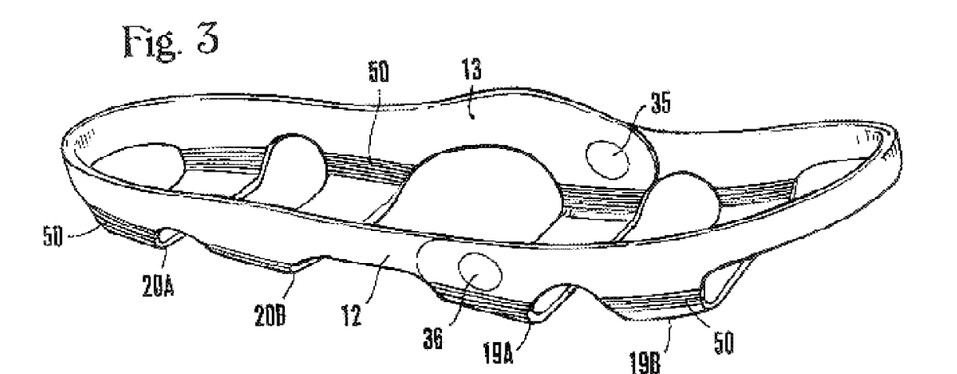
FIG. 3 is a side view of a portion of a scaffolding of the invention, including a rotating pin hinge in a flex point along the annular frame of the scaffolding, as well as a shock-attenuating rubber bar in side pillars of the scaffolding.

Further means to permit rotation of annular frame 11 itself are depicted in FIG. 3; in particular, rotation means are provided at flex points in the frame. As shown, such rotation means are active ones consist of top mounted rotating pin hinges (see, e.g., pins 35 and 36) disposed at the top of, respectively, any or all of side pillars 19A, 19B, 20A and 20B, on both lateral side 12 and medial side 13 of frame 11. It will be appreciated that other rotation means, both active and passive, may be employed in lieu of, or in conjunction with, rotating pin hinges as shown. For example, bars 50 of a flexible material, such a closed cell polyurethane, ethylene vinyl acetate, or rubber, are embedded at discrete points to enable them scaffolding 10 to bend and/or compress, thereby providing flexibility and shock attenuation to the device. Alternatively, tension springs, pistons, or the like may be used.

Means for allowing adjustments to the height of frame 11 may also be provided. For example, click-stops may be provided in opposing side pillars extending downwardly from both lateral side 12 and medial side 13. Such click-stops enable one to raise and lower all or a part of the frame to a desired height within a shoe. Alternative adjustment means are extant in the art; for example, pistons, air or fluid filled bladders, or electronically-controlled solenoids could be used.

Lattice 30 is shown in FIG. 2, in place on scaffolding 10. In this embodiment, lattice 30 is attached around the circumference of annular frame 11. The attitude of lattice 30 varies throughout its length, depending on the nature of support and gait control to be provided by the device.

Figure 4:
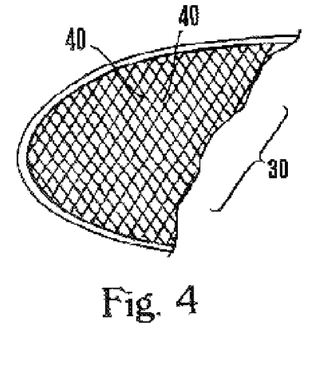
FIG. 4 is a top view of a portion of the woven lattice of FIG. 2, showing fibers of the mesh.

For example, a contour in annular frame 11 intended for providing added support and control of gait is shown at raised edge 26, which consists of a convex portion of medial wall 13 spanning midfoot region 16. When lattice 30 is in place as shown in FIG. 4, its medial side 31 (medial to line C—C) lies in a higher plane along raised edge 26, to provide support for the arch of a foot. Increasing the cant of medial side 31 (by increasing the convexity of raised edge 26, as compared to lateral side 12 of frame 11) provides for a higher arch support, while lowering the cant provides for a lower arch support.

Additionally, canting raised edge 26 upward in comparison to lateral side 12 of frame 11 stretches lattice 30 across midfoot region 16 of the frame (over gap 25), thereby making the lattice more rigid along the midfoot region than along the heel and forefoot regions of the device. However, if a high arch support with less rigidity in the lattice is desired (to give a more cushioned feel to the arch support), the weave, thickness or fiber content of the lattice may be varied within the midfoot region.

Figure 8:
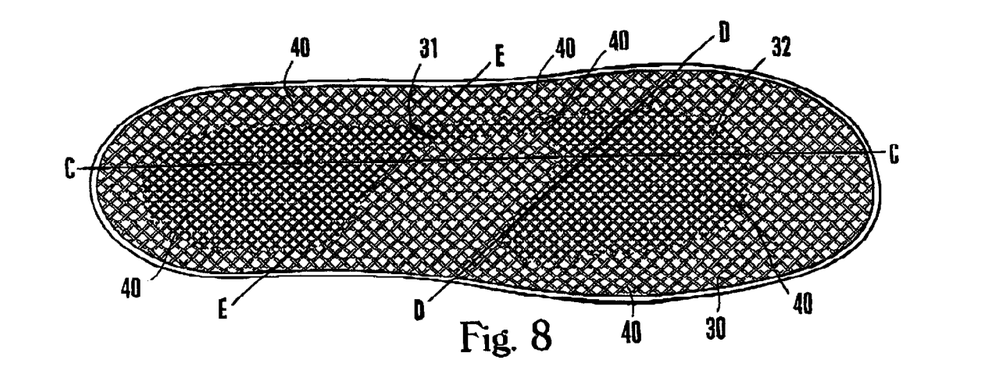
FIG. 8 is a top view of a portion of a lattice, showing use of varying materials throughout to provide control of gait.

For example, as shown in FIG. 2, a raised arch support is provided by upwardly canting raised edge 26 of medial frame wall 13. However, the variation in tension on the lattice in the midfoot region as compared to the heel and forefoot areas may be lessened by providing a looser weave in the midfoot region (see, FIG. 9). Other modifications to the rigidity of the lattice at varying points therein may be provided by using layered mesh at discrete points, varying the thickness or weave of fibers in the lattice (making them less or more susceptible to increases in tension), or by using fibers of differing materials at discrete points in the lattice. For example, FIG. 8 shows a twill weave lattice in which a high modulus material, such as glass fibre nylon, is used as both the warp and weft along the midfoot region, and an elastomer having a low modulus is used as the weft (against a glass fibre nylon warp) in the heel and forefoot regions. Further details concerning differing materials and constructions for use in the lattice are provided elsewhere below.

Figure 13:
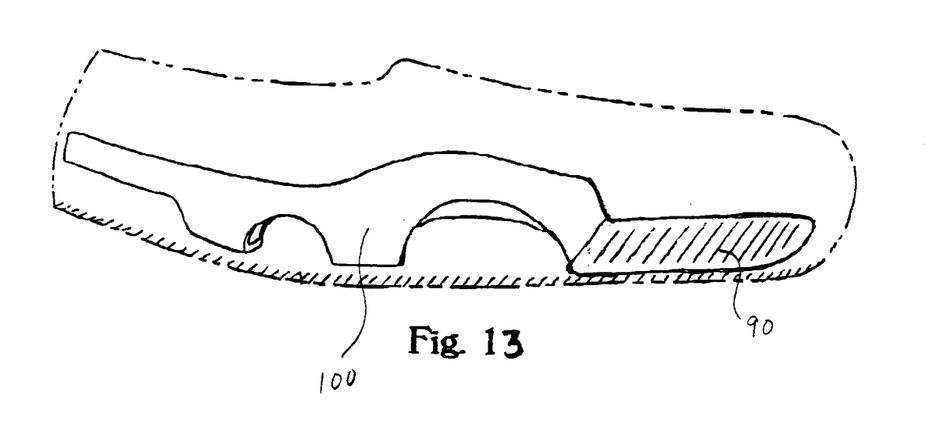
FIG. 13 is a side view of a ¾ length scaffolding, showing the lattice terminating forward of the medial midfoot region (at the arch), where conventional cushioning is used to support the forefoot.

It will be appreciated that the attitude of lateral wall 12 or medial wall 13 may be raised or lowered at discrete points in annular frame 11, as compared to other portions of the frame, to provide functionalities other than arch support. For example, as shown in FIG. 2, toe end 15 cants upwardly along the length of gap 22 to as much as a 40° angle of toe spring to provide additional support to the metatarsals, and to aid in toe-off during gait, by providing an angled surface along the lattice for the toes to engage and push off from. Excellent metatarsal support may also be provided by eliminating toe end 15, and terminating scaffolding 10 at side pillar 19B in forefoot region 14. Such as shortened scaffolding allows the leading edge of the device to terminate just forward of the metatarsal heads, allowing the toes to push against the shoe insole during gait. As shown in FIG. 13, additional cushioning for the forefoot may be provided by supplying a pad, such as a foam mat or air-filled bladder 90, forward of the location shown for side pillar 19B.

Figure 7:
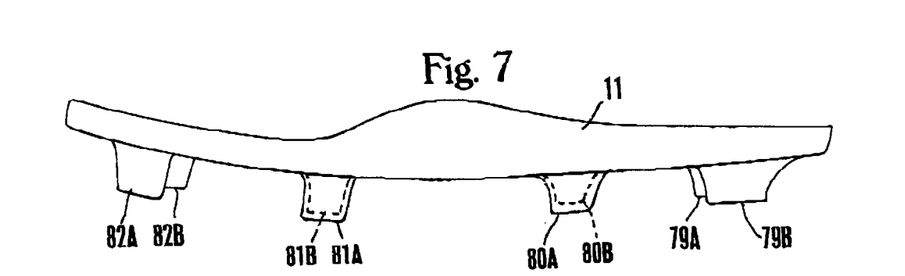
FIG. 7 is a representative scaffolding in which the side pillars do not extend beneath the lattice.

A number of structural adaptations of scaffolding 10 for use in different shoe types may be made. For example, for use in a sandal configuration, side pillars 19A, 19B, 20A and 20B may be absent (so that annular frame 10 rests on, and is secured directly to, the outsole of the sandal), or shortened to form downwardly extending flanges, the ends of which engage the outsole, as shown in FIG. 7 (see, flanges 79A and B, 80A and B [B is in phantom], 81A and B [B is in phantom], and 82A and B). For use in a woman's pump, heel end 18 may be canted or adjustable upwardly, as compared to midfoot region 16, and side pillar 20A may be absent.

The degree to which the attitude of lattice 30 is altered at discrete points to provide desired support and gait control will vary depending on the kind of support or gait control sought. Those of ordinary skill in the art are fully capable of determining, for example, an appropriate angle for use in cushioning the metatarsals (e.g., by canting forefoot region 34 of the lattice upwardly to vary 2° to 10° from level); or for providing control over pronation (by raising lateral side 32 of the lattice 5° to 40° with respect to medial side 33) and supination (by raising medial side 31 of the lattice with respect to lateral side 32); or for stabilizing the heel (by deepening the concavity of the lattice in heel region 37 to cup the heel). Thus, although particular dimensions are given for the scaffolding as shown in FIG. 1, to provide a lattice having the particular attitude shown in FIG. 2, it will be appreciated that the invention encompasses modifications to the dimensions shown, which dimensions are within the ordinary skill of the art to achieve, in view of the present disclosure.

In that respect, the scaffolding of FIG. 1 is 11.55 inches (") in total length, and has the following dimensions (also indicated in the drawing):

TABLE 1

Dimensions of Scaffolding to 1/100th of an inch (FIG. 1).

| Forefoot Region (14) | Midfoot Region (16) | Heel Region (17) |
|---|---|---|
| Toe end 15 = .49" H | Raised edge 26, on medial side 13 = .90" H at forward end; .68" in H at rearward end | Heel end 18 = .35" H |
| Annular frame 11, extending from edge to edge of gap 21 = .55H, on lateral side 12; and .34" on medial side 13 | Annular frame 11, extending from edge to edge of gap 25 = .58" H, on lateral side 12 | Annular frame 11, extending from edge to edge of gap 23 = .61" H, on lateral side 12; and .52" H on medial side 13 |
| Side pillar 19B = 1.46" H from base to top of annular | Side pillar 19A = 1.42" in H from base to top of annular | Side pillar 20A = 1.15" in H from base to top of annular |

TABLE 1-continued

Dimensions of Scaffolding to 1/100th of an inch (FIG. 1).

| Forefoot Region (14) | Midfoot Region (16) | Heel Region (17) |
| --- | --- | --- |
| frame 11 | frame 11; Side pillar 20B = 1.41" H | frame 11 |
| Side pillar 19B = 4.03" W, from lateral side 12 to medial side 13; 1.04" W, from forwardmost to rearwardmost edge of bight | Side pillar 19A = 4.55" W, and, Side pillar 20B = 3.65" W both measured from lateral side 12 to medial side 13; 1" W, from forwardmost to rearwardmost edge of the bights | Side pillar 20A = 3.63" W, from lateral side 12 to medial side 13; 0.94" W, from forwardmost to rearward most edge of bight |

B. Scaffolding Materials

Scaffolding 10 may be constructed of any resilient, durable, lightweight material, preferably one capable of extrusion or injection molding. Particularly well-suited materials include polypropylene, non-thermoplastic polymers such as aramid polymer fibres (e.g., Kevlar®), nylons (including glass fibre nylons), carbon graphite, polyester resins, liquid crystal polymers, or lightweight metals, such as titanium and aluminum. If scaffolding 10 is to be incorporated into a shoe upper, materials suitable to allow attachment of the shoe upper fabric to annular frame 11 may be selected by one of ordinary skill in the art. As required, elements of other composition, such as metallic hinge parts, may also be incorporated into the scaffolding structure.

III. Lattice

As shown in FIG. 2, lattice 30 has lateral and medial sides (respectively, elements 31 and 33), and includes a forefoot region 34 (extending rearwardly from toe end 35 to line A—A), a midfoot region 36 (lying between line A—A and line B—B), and a heel region 37 (extending rearwardly from line B—B to heel end 38). As shown in FIG. 4, the lattice of FIG. 2 is constructed of individual fibers, which are woven into an twill weave, open pore mesh (FIG. 4). A number of alternatives to the twill weave configuration for the lattice, including non-woven fabrics (see, e.g., FIG. 10), are also suitable for use in the invention, and are described below.

In all such embodiments, the principal load bearing component of the lattice is a non-elastomeric polymer or metal based homogenous or composite fibre or yarn. Non-elastomeric materials useful in both woven and non-woven embodiments of the lattice are those which retain a high to medium modulus under increasing strain (little deformability); possess little or no tendency toward "sag and creep"; possess relatively high tensile strength (low elongation to break), and high dimensional stability (which may be an inherent property of the material, or one imparted during manufacture, as in by resin coating and heat setting).

Lattice 30 may be constructed entirely of a high to medium modulus material, preferably in a weave which varies from medium texture (from 10 to 35 threads per centimeter) in areas requiring less stiffness, to fine texture (35 threads per cm., or greater) in areas requiring greater stiffness. An especially advantageous embodiment is one in which the lattice is constructed of a mixture of high/medium and low modulus materials, to provide either a one-way stretch lattice (with the stretch preferably running in the warp direction [side to side]), or one in which stretch is provided to a greater degree in the warp direction, than from heel to toe (weft direction).

To this end, a relatively low modulus material is interwoven with higher modulus materials to form a mesh having a higher modulus (little stretch) in the warp direction and a low modulus (stretch) in the weft direction. Preferably, the composition of the lattice varies so that high to medium modulus materials are present in areas requiring greater rigidity (e.g., beneath the arch, heel and metatarsal heads of the foot), and low modulus materials are present in areas requiring greater stretch (e.g., under the toes). Additionally, very low modulus materials (e.g., cotton or spandex) may be interwoven into a mesh as an additional ply to provide the lattice with a softer hand.

Suitable materials for use as the load-bearing components of the lattice include homogenous or composite fabrics of:

| MATERIAL TYPE | COMPARATIVE VALUES |
| --- | --- |
| Aramid polymers (e.g., Kevlar ®, aramid fibers from DuPont; Twaron ®, aramid fibres from Twaron) | Higher tensile strength than glass fibre nylon and carbon fibre; lower compressive strength than glass fibre nylon and carbon fibre; medium modulus. Example: Kevlar 49 (1140 denier): 23 gpd (tensile strength); 900 gpd initial modulus; creep rate v. log time (40–58% loading) 0.020; elongation 2.5%. |
| Nylons (30 to 1500 denier) Ripstop air textured nylon (Cordura ®, from | Lower modulus than carbon fibre or aramid fibres; strong, relatively low cost. Example: |

-continued

| MATERIAL TYPE | COMPARATIVE VALUES |
| --- | --- |
| DuPont) Nylon 6, Nylon 6,6, and Nylon 6-6,6 co-polymer | Cordura ®, with Lycra ®: Commercially available in one-way and two-way stretch fabrics, this blend can be used in warp only, fill only or a combination of both. |
| Carbon fibres | High tensile strength (lower than aramid fibres); modulus 3–4 times higher than glass fibre. Example: Hi modulus carbon fibre (graphite): 11 gpd tensile strength; 3000 gpd initial modulus; elongation 0.4%. |
| Liquid crystalline polymer (textile grade) | High tensile strength, high modulus. Example: Heat-treated PBZT (poly(p-phenylene benzobisthiazole filaments): 25–30 gpd tensile strength; 2100–2400 gpd initial modulus; elongation 1–1.4%. |
| Lightweight metal alloys (e.g., titanium, aluminum; metal matrix composite) | Modulus comparable to aramid fibres; high strength (especially if heat-treated); titanium resists fatigue to a greater degree than does aluminum; relatively high cost. Example: 3-2.5 titanium: 135 kPsi tensile strength; 10–19% elongation. |
| Relatively high modulus thermoplastic polyesters (e.g., Hytrel ®, from DuPont [preferably, Hytrel.RTM, with a durometer of 55 on the D-scale, or more specifically, Hytrel.RTM. grade 5544 or 5556) and Right Flex ®, from Ticona) | Lower modulus than Kevlar, with a softer hand; high strength, some minor tendency toward creep/sag. Example: Hytrel.RTM ®, grade 5556: Extruded block copolymer of polyetramethylene terephthalate polyester and polytetramethylene ether. Medium modulus (110 MPa, at 100° C.), 40 kpsi tensile strength; elongation 500%. Grade 5544 has a 125 MPa at 100° C., 31 kpsi tensile strength, and elongation 375%. |

Those of ordinary skill in the art will recognize that the tendencies toward "sag and creep" of these materials vary; in general, preferred materials for use in the invention will be those with little such tendency. In view of the teachings of this disclosure, materials other than those listed above which are suitable for use in constructing the lattice may be identified.

Suitable materials for use as low modulus components of the lattice include:

| MATERIAL | COMPARATIVE VALUES |
| --- | --- |
| Extrudable aromatic polyesters (e.g., polytrimethylene terepthalate, or PTT, from Shell Corterra) | Modulus comparable to nylon, lower tensile strength. Properties similar to spandex, at lower deniers. |
| Spandex (e.g., Lycra ®, from DuPont) | Wider availability than PTT. |
| Non-spandex polyester yarns and upholstery grade fibrous yarns | Most are very low modulus. |
| Microfibers | Excellent feel and drapability, most are very low modulus. |

As noted, most preferably, the composition of the lattice varies from region to region, to provide greater support in some areas, or softer support in others. For example, referring to FIG. 8, an embodiment of the lattice is shown in which medial side 31 of midfoot region 36 (medial to midline C—C), a portion 32 of forefoot region 34 (forward of line D—D, to underlie the metatarsal heads), and a portion of heel region 37 (rearward of line E—E) are formed of nylon or tightly woven Hytrel®. Adjacent regions of the lattice (including midfoot region 36 lateral to line C—C) are formed of Hytrel®. The nylon portions of the lattice are relatively inelastic, and provide support to, respectively, the medial arch (to control supination), the metatarsal heads (to aid in support of the toes), and the heel (to enhance stability). The Hytrel® portions of the lattice have a moderate modulus of elasticity, and provide more gentle support to the remainder of the foot.

Those of ordinary skill in the art will appreciate that the particular arrangement of varying materials shown in FIG. 8 may be varied, depending on the desired degree of control to be provided. For example, a relatively inelastic material may be provided at the lateral side of line C—C, and a more elastic material at the medial side of line C—C, to aid in control of pronation. This embodiment of the invention, as well as all others, may be constructed using known techniques; for example, lattice 30 may be provided with differing fiber content by changing the material loaded onto a loom at predetermined points during the weaving process.

Control of gait, as described with respect to FIG. 8, may also be provided by varying the relative tension and weave of fibers in different regions of lattice 30. For example, as shown in FIG. 9A, medium to high modulus fibers 40 are provided (to run mediolaterally between lateral side 12 and medial side 13 of annular frame 11), and are interwoven with lower modulus fibers 41 (to run diagonally or longitudinally across fibers 40). Using Hytrel® as a reference point, fibers 40 are prestretched between 6 to 9% elongation to assist in maintaining the desired contour of lattice 30. Fibers 40 may also be provided in both the diagonal/longitudinal and mediolateral directions of lattice 30, and the fibers in each direction may be pretensioned to the same or different degrees, depending on the desired attitude of each region of lattice 30.

Figure 10:
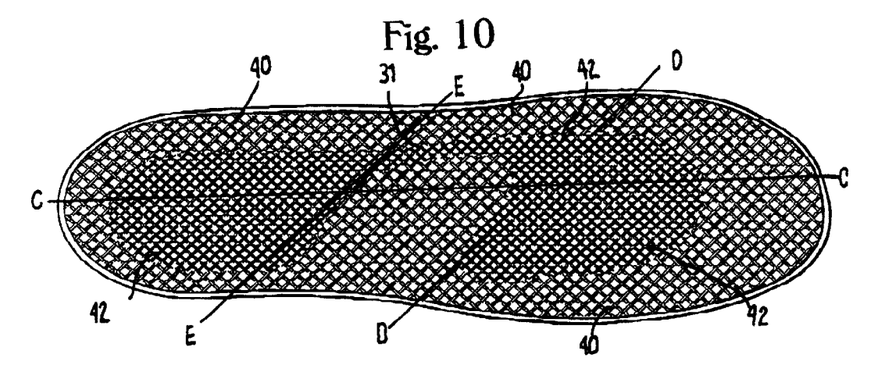
FIG. 10 is a top view of a portion of a lattice, showing use of varying fiber densities throughout to provide control of gait.

To the same end, referring to FIGS. 4 and 10, the density and weave of the fibers may also vary. For example, fibers 40 may be variably woven to present elliptical, rounded or squared pore shapes of equal or varying sizes, depending on the relative tension to be provided in each region of lattice 30. The density of the fibers may also be varied to provide more cross-fibers in regions under greater tension, and vice-versa. As shown in FIG. 10, fibers 40 in midfoot region 36 medial to line C—C have a density of about 35 yarns/square inch (providing a stiffer mesh), compared to a 20 yarns/square inch density in fibers 42 lateral to line C—C.

Because the wearer's foot rests directly on lattice 30 (separated only, if present, by a sock or the like), the feel of the mesh against the foot is a consideration. A plurality of additional fibers, and/or fibrous yarn strands, may also be interwoven with fibers 40, to form a third layer of mesh, to soften the hand of lattice 30, or such strands may replace a portion of fibers 40 running in either the diagonal or mediolateral direction. For example, fibrous yarn strands may be interwoven with fibers 40 at a density of approximately 7–10 strands per inch. Using a polyester yarn such as Lycra® as a reference point, such strands are preferably pre-stretched between 3% and 5% elongation in order to maintain the desired attitudinal contours in lattice 30.

Figure 9B:
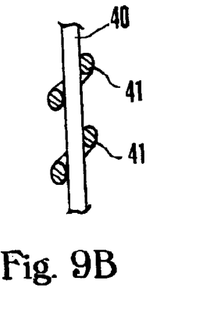
FIG. 9B is a cross section of FIG. 9A, showing a portion of a lattice, showing use of fibers in discrete regions of the lattice under differing degrees of tension, relative to adjacent regions of the lattice, to provide control of gait.

To further enhance comfort, the cross-sections of fibers 40, and any strands of other material present, preferably have a width to height ratio in the range of about 1.5:1 to 2:1 (see, e.g., FIG. 9B). So configured, the wearer will be less likely to feel pressure from individual fibers and strands. For example, applying the desired width to height ration, where fibers 40 have a width of approximately 0.02479 inches and a height or thickness of approximately 0.01636 inches, lattice 30 contains about 24–26 fibers per inch. As a further example, where fibers 40 have a width of 0.02800 inches and a height or thickness of approximately 0.01700 inches, lattice 30 contains about 20 fibers per inch.

To maintain the pore spacing fibers 40 preferably weave alternately above and below adjacent strands in the group. This configuration provides a relatively large surface area which distributes pressure on the wearer's foot, and to encourage the material to "breathe"; i.e., allow for air circulation. As an alternative to use of a woven mesh, the mesh may be formed by extrusion or molding of a sheet (0.25 mm or greater in thickness) of an elastomeric polymer, such as Hytrel®, which is perforated to provide pores for aeration.

Additional cushioning may be provided in discrete areas of the lattice. For example, air or fluid-filled bladders may be secured beneath areas of the lattice (see, FIG. 13, showing a foam pad disposed forward of midfoot region 34). However, if used, such additional cushioning should be used sparingly, to avoid defeating the suspension characteristics of the device.

III. Construction of the Device of the Invention

As shown in FIG. 2, lattice 30 is attached along, or adjacent to, the upper rim of annular frame 11, in the desired, pre-stretched conformation. The attachment means employed to secure lattice 30 to annular frame 11 will vary with the material utilized in lattice 30, but may include co-molding of lattice 30 and scaffolding 10, spot welding, adhesives or mechanical attachments.

Figure 6:
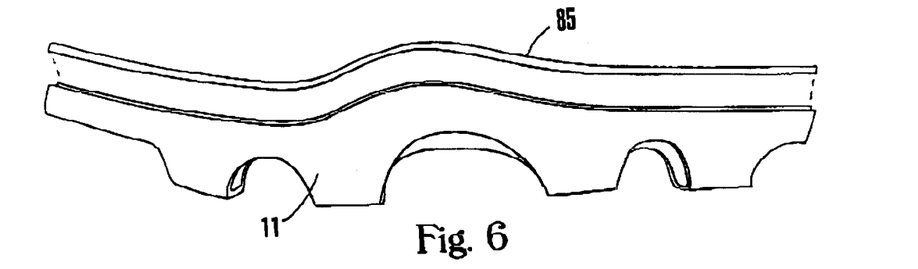
FIG. 6 is an exploded side view of a scaffolding with a removable rim thereon for attachment of a lattice.

For example with respect to the latter, lattice 30 may be extruded or otherwise constructed so the ends of each strand are attached to, or an integral part of, a removable upper rim portion of annular frame 11. Conveniently, as shown in FIG. 6, such upper rim portion 85 may be removably secured to annular frame 11, as in a tongue-and-groove attachment, so lattice 30 (not shown in FIG. 6) may be exchanged with a new or differently configured lattice by the wearer.

Figure 5:
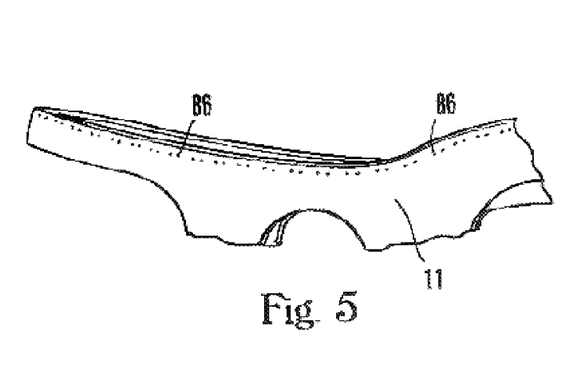
FIG. 5 is a side view of a scaffolding with a lattice attached by threading through grommets in the annular frame.

Individual fibers may also be secured to annular frame 11 by extension through grommets disposed therein (see, grommets 86 of FIG. 5). In such an embodiment, adjustment means may be provided to allow the wearer to adjust the relative tension placed on individual fibers by pulling the fibers more tautly through each grommet or, conversely, by loosening each fiber. To this end, each grommet may be supplied with threading within its bore, matched by threads along the fiber, to serve as click-stops to retain the fiber within the grommet at predetermined points. Alternatively, each fiber may be stretched or loosened within each grommet, and knotted outside of each grommet, to permit changes to be made to the tension placed on the fiber. For durability, each fiber may be coated or modified at its end attachment point with a high modulus material, for example, glass fibre nylon.

Molded attitudinal adjustments in lattice 30 are provided by adjusting the contours at discrete regions of the lattice. For example, as shown in FIG. 2, a concavity is provided in heel region 37 to serve as a well to accept and stably hold the heel of a foot, and another concavity is provided beneath the metatarsal heads in forefoot region 34, and rise in attitude forward of that point, to stabilize the forefoot. Contouring of the mesh can be achieved in various ways known to those of skill in the art, depending on the composition of the fibers used. For example, the lattice may be molded, heat-set or individual fibers resin coated and cured to provide, and maintain, desired contours therein.

A non-exhaustive example of a method for providing contours in lattice 30 during manufacture is as follows. A molding tool including an upper mold member and a lower mold member is provided with recesses which are configured to receive upper and lower members of a loom, and opposing recesses which define one or more cavities of desired dimensions. On looming of the lattice material, including compression thereof into the desired cavities, a plastic resin is then injected into the cavities to secure the periphery of the lattice, and the mold members are pulled apart to release the finished lattice.

IV. Shoes Incorporating the Device of the Invention Therein

Figure 11:
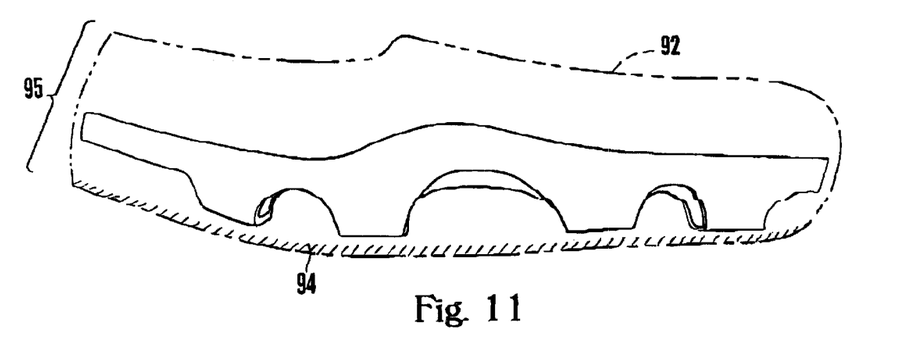
FIG. 11 is a side view of a shoe of the invention, into which the scaffolding and lattice structure is inserted. The shoe is shown in a transparent outline in the drawing.

As shown in FIG. 11, scaffolding 10 is placed into a shoe 95 so annular frame 11 closely fits along the inner perimeter of the shoe upper 92. Where side pillars 19A, 19B, 20A and 20B extend transversely across scaffolding 10 to form "U" shaped members, the bight thereof will rest on the base 94 of the shoe. The shoe base may be a unitary length, or may be formed of bands on which each "U" shaped member is disposed. Said shoe base may also be provided with additional cushioning elements, such as air or fluid-filled bladders, especially for use in those areas of the shoe in which the lattice does not serve as a midsole; e.g., for use in the forefoot region with embodiments of the inventive device which terminate in length at the metatarsal heads, as shown in FIG. 13 (see, pad 90, forward of ¾ length scaffolding 100).

Figure 12:
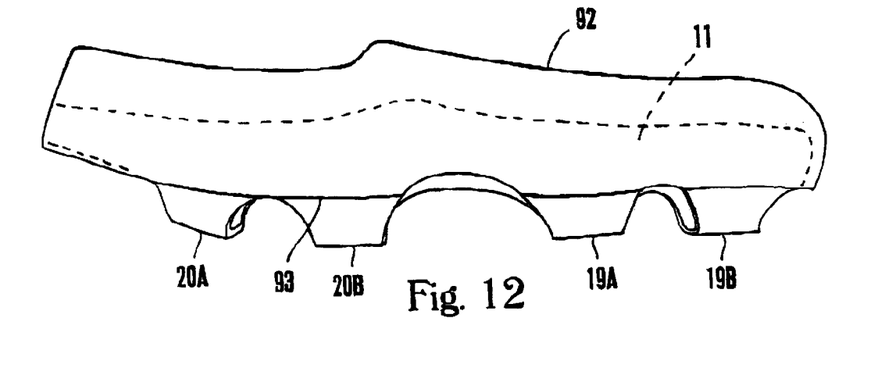
FIG. 12 is a side view of a shoe of the invention, in which the shoe upper and scaffolding are formed as a unitary piece.

As noted elsewhere above, a preferred embodiment of the invention is one in which annular frame 11 is attached to, or made an integral part of, a shoe upper. For example, with reference to FIG. 12, where the shoe upper 92 is a fabric or microfiber material, such material may be woven or sewed as layers encompassing annular frame 11 (shown in phantom) within the sidewalls of the upper. As shown in FIG. 12, side pillars 19A, 19B, 20A and 20B protrude out of the bottommost edge 93 of the material which forms upper 92, but may be absent, or shortened to form flanges (elements 79A through 82B of FIG. 7) to engage the shoe base (not shown).

Alternatively, annular frame 11 may be secured to, or co-molded as an integral part of, the base of the shoe. In such an embodiment (with reference to the scaffoldings illustrated in FIGS. 1 and 7), side pillars 19A, 19B, 20A and 20B (FIG. 1) would be absent, or shortened to form flanges (elements 79A through 82B of FIG. 7) to securely engage the shoe base; e.g., through co-molding of the flanges with the shoe base, by insertion into slots therein, or by other suitable attachment means.

The invention having been fully described, additional embodiments, modification and adaptations thereof may become apparent to those of ordinary skill in the art. All such iterations of the invention are intended to be encompassed by the appended claims.

The invention claimed is:

1. A sole construction for use in a shoe, to support a foot by placing the foot in suspension within a shoe having an upper and a base, the sole construction comprising:
   scaffolding means placeable within the shoe at its inner perimeter; and,
   a lattice attached to the scaffolding means, wherein the lattice comprises fibers disposed in a weft direction extending toward the toe and heel of the shoe, and fibers disposed in a warp direction extending between the sides of the scaffolding means, wherein fibers comprising a polymer or metal having an initial modulus of elasticity between 110 MPa and 900 gpd are disposed in the warp direction of the lattice, and wherein further the fibers throughout substantially all of the lattice are less than taut, yet under tension sufficient to maintain the lattice above the base of the shoe.

2. The sole construction according to claim 1, wherein the scaffolding means comprises a resilient annular frame having medial and lateral opposing sides attached to the lattice and adapted to fit along the inner perimeter of the upper; and further comprises support pillars extending downwardly from the annular frame.

3. The sole construction according to claim 2, wherein one or more of the support pillars extend beneath the lattice to form a "U" shaped member having a bight seatable on the base of the shoe.

4. The sole construction according to claim 3, wherein one or more of the annular side members include rotation means to allow the side members, when disposed in the shoe, to move in a vertical plane adjacent to flex points in the foot.

5. The sole construction according to claim 4, wherein the rotation means consists of a hinge, spring, piston, rotating pin, solenoid, or a flexible polymer member.

6. The sole construction according to claim 5, wherein the flexible polymer consists of a closed cell polyurethane, ethylene vinyl acetate, or rubber.

7. The sole construction according to claim 2, wherein the support pillars include means for shock absorption.

8. The sole construction according to claim 2, wherein the annular frame is adapted to fit along the lateral and medial aspects of a forefoot region of a foot, and the lattice consists of a forefoot region consisting of a forward portion distal to the ball of the foot, as well as a rearward portion underlying the ball of the foot; and wherein further a portion of the forward portion of the lattice is adapted to receive the metatarsal heads of a foot, and is suspended in a higher plane than the rearward portion of the lattice.

9. The sole construction according to claim 2, wherein the annular frame is adapted to fit along the lateral and medial aspects of a midregion of a foot extending proximally from the ball of the foot toward the heel; and wherein further the medial aspect of the mid-region of the lattice is adapted to receive the arch of a foot, and is suspended in a higher plane than the lateral aspect of the mid-region of the lattice.

10. The sole construction according to claim 1, wherein one or more regions of the lattice are carried by the scaffolding in a higher plane than other regions of the lattice.

11. The sole construction according to claim 1, wherein the lattice is removably attached to the scaffolding.

12. The sole construction according to claim 11 wherein the scaffolding further includes a removable annular rim, and the lattice is attached to said removable annular rim.

13. The sole construction according to claim 1, wherein the lattice is permanently attached to the scaffolding.

14. The sole construction according to claim 13, wherein the lattice is constructed of interwoven fibers, and each of said fibers is secured to the scaffolding by insertion through a grommet disposed in the annular frame.

15. The sole construction according to claim 1, wherein the lattice is integrally formed as part of the scaffolding.

16. The sole construction according to claim 15, wherein the lattice is co-molded with the scaffolding.

17. The sole construction according to claim 1, wherein portions of the fibers in the lattice are under a greater relative tension than others.

18. The sole construction according to claim 1, wherein the fibers in the warp direction are comprised of a composite of polyetramethylene terephthalate polyester and polytetramethylene ether.

19. The sole construction according to claim 18, wherein the composite fibers have the additional physical properties of elongation to break at 375%, and tensile strength of at least 31 kpsi.

20. The sole construction according to claim 1, wherein polymer or metallic fibers having an initial modulus of elasticity between 110 MPa and 900 gpd are also disposed in the weft direction of the lattice.

21. The sole construction according to claim 1, wherein fibers having an initial modulus of 110 MPa are disposed in the warp direction of the lattice.

22. The sole construction according to claim 1, wherein the fibers running in the weft direction of the lattice comprise low modulus fibers.

23. The sole construction according to claim 22, wherein the low modulus fibers are comprised of materials selected from the group of such materials consisting of spandex, extrudable aromatic polyesters, upholstery grade fibrous yarns, microfibre yarns, and non-extrudable polyester yarns.

24. The sole construction according to claim 1, wherein fibers comprised of materials selected from the group of materials consisting of nylon, carbon graphite, liquid crystal polymers, aramid polymers, and lightweight metal alloys are disposed in the warp direction of the lattice.

25. The sole construction according to claim 1, wherein the lattice includes (a) a forefoot region consisting of a forward aspect to extend distally from the metatarsal heads of the foot, and a rearward aspect to underlie the metatarsal heads of the foot; (b) a midfoot region extending proximally from the ball of the foot toward the heel, which midfoot region has medial and lateral aspects; and (c) a heel region.

26. The sole construction according to claim 25, wherein the medial aspect of the midfoot region is formed of a high modulus polymer or metal, and the lateral aspect of the midfoot region is formed of a medium modulus polymer.

27. The sole construction according to 25, wherein the heel region includes a concavity therein adapted to receive the heel of a foot, and said concavity is formed of a high modulus polymer or metal; wherein further portions of the heel region adjacent to the concavity are formed of a medium modulus polymer.

28. The sole construction according to claim 25, wherein the rearward aspect of the forefoot region is formed of a high modulus polymer, and the forward aspect of the forefoot region is formed of a medium modulus polymer.

29. The sole construction according to claim 25, wherein the fibers of the medial aspect of the midfoot region is woven at a density greater than 20 threads per square inch; and the fibers of the lateral aspect of the midfoot region is woven at a density of 20 threads per square inch, or less.

30. The sole construction according to claim 25, wherein the heel region includes a concavity therein adapted to receive the heel of a foot, and the fibers of said concavity are woven at a density greater than 20 threads per square inch; and the fibers of the portion of the heel region adjacent to the concavity are woven at a density of 20 threads per square inch, or less.

31. The sole construction according to claim 25, wherein the fibers of the rearward aspect of the forefoot region are woven at a density greater than 20 threads per square inch; and the fibers of the forward aspect of the forefoot region are woven at a density of 20 threads per square inch, or less.

32. The sole construction according to claim 25, wherein the density of the fibers in the lattice varies among its regions.

33. The sole construction according to claim 25, wherein the composition of the fibers in the lattice varies among its regions.

34. The sole construction according to claim 25, wherein the relative tension placed on the fibers in the lattice varies among its regions.

35. The sole construction according to claim 25, wherein the medial aspect of the midfoot region of the lattice is adapted to receive the arch of a foot, and is suspended in a higher plane than the lateral aspect of the midfoot region of the lattice.

36. The sole construction according to claim 25, wherein the forward portion of the forefoot region of the lattice is adapted to receive the metatarsal heads of a foot, and is suspended in a higher plane than the rearward portion of the forefoot region of the lattice.

37. The sole construction according to claim 1, wherein the fibers running in the warp direction of the lattice are under higher relative tension than the fibers running in the weft direction of the lattice.

38. A shoe having an improved sole construction, the shoe comprising an upper, a base, and the improved sole construction of claim 1.

39. The shoe according to claim 38, wherein the scaffolding means comprises a resilient annular frame having medial and lateral opposing sides attached to the lattice.

40. The shoe according to claim 39, wherein the resilient annular frame is adapted to fit along the inner perimeter of the upper; and further comprises support pillars extending downwardly from the annular frame.

41. The shoe according to claim 40, wherein the support pillars extend beneath the lattice to form a "U" shaped member having a bight seatable on or under the base of the shoe.

42. The shoe according to claim 40, wherein the support pillars securely engage the base of the shoe to retain the sole construction in place therein.

43. The shoe according to claim 39, wherein the resilient annular frame is an integral part of the shoe upper, so the scaffolding and shoe upper form a unitary structure.

44. A method for manufacture of a shoe having an upper, a base, and an improved sole construction, the method comprising forming the sole construction of claim 1 as a unitary part of the shoe upper, then securing the upper to the shoe base.

45. The method according to claim 44, wherein the sole construction and upper are co-molded.

46. The sole construction according to claim 1, wherein the fibers are woven to a density in the range of 10 to 35 threads per centimeter.

47. The sole construction according to claim 46, wherein portions of the lattice comprise fibers which are woven to a density greater than fibers in adjacent portions of the lattice.

48. The sole construction according to claim 47, wherein portions of the lattice comprise fibers woven to a density in the range of 20 to 35 threads per centimeter, while adjacent portions of the lattice are woven to a density of 20 threads per centimeter or less.

49. The sole construction according to claim 1, wherein the lattice further comprises additional low modulus fibers interwoven with the fibers extending in the warp and weft directions of the lattice, wherein the additional low modulus fibers are interwoven to a density of 20 threads per centimeter or less.

50. The sole construction according to claim 49, wherein the additional low modulus fibers are interwoven to a density of 10 threads per centimeter or less.

51. A method for manufacture of a shoe having an upper, a base, and a lattice secured to the upper, wherein the lattice comprises fibers disposed in a weft direction extending toward the toe and heel of the shoe, and a warp direction extending between the sides of the scaffolding means, wherein fibers composed of a polymer or metal having an initial modulus of elasticity between 110 MPa and 900 gpd are disposed in the warp direction of the lattice; wherein the method comprises (a) securing the lattice to the upper so that the fibers throughout substantially all of the lattice are less than taut; and (b) securing the upper to the base.

* * * * *